Oct. 6, 1953 — T. A. PURVIS — 2,654,510
CORN PLANTING MACHINE HAVING ROTARY
GROUND-ENGAGING SEED RESERVOIRS
Filed July 25, 1949 — 2 Sheets-Sheet 1

INVENTOR.
Thomas A. Purvis
BY
Attorney.

Oct. 6, 1953
T. A. PURVIS
2,654,510
CORN PLANTING MACHINE HAVING ROTARY
GROUND-ENGAGING SEED RESERVOIRS
Filed July 25, 1949
2 Sheets-Sheet 2
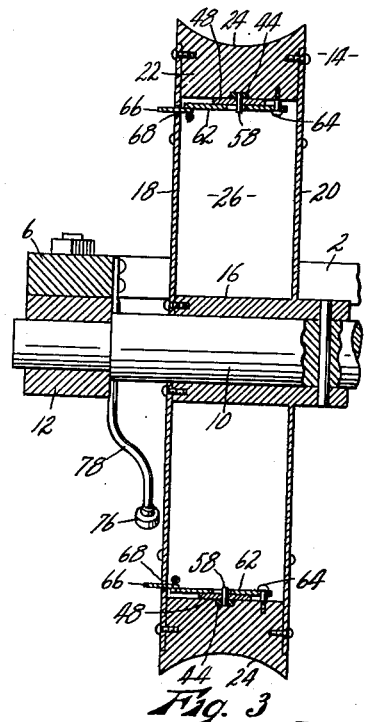
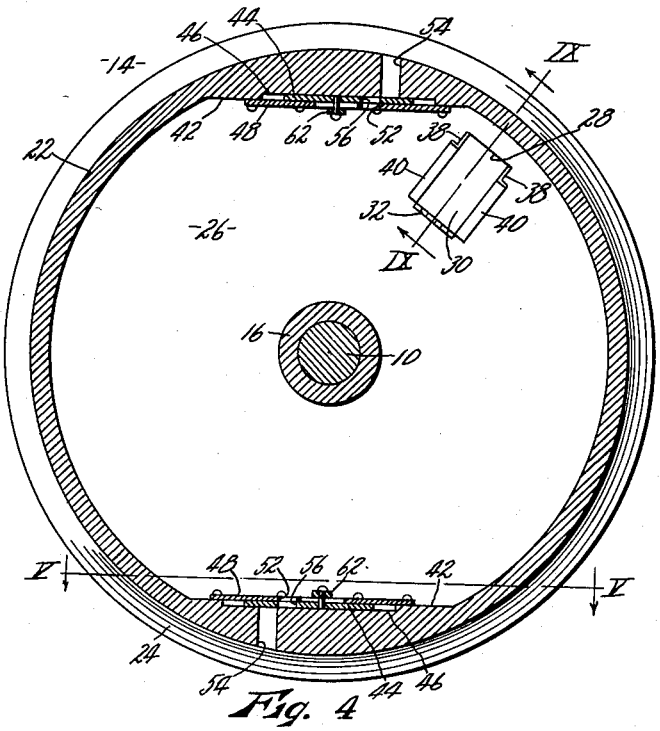
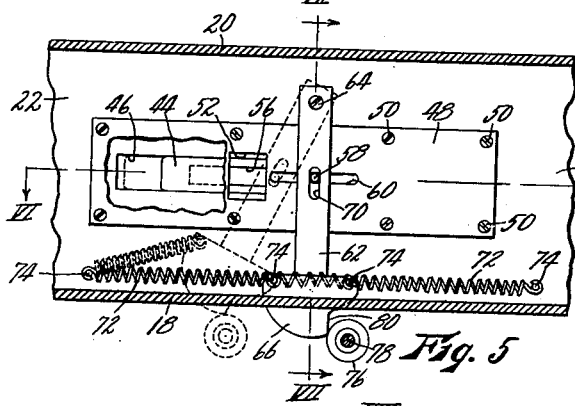
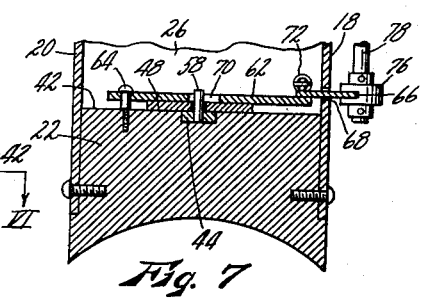
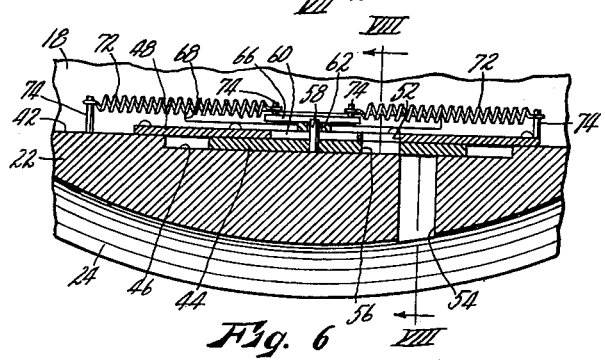
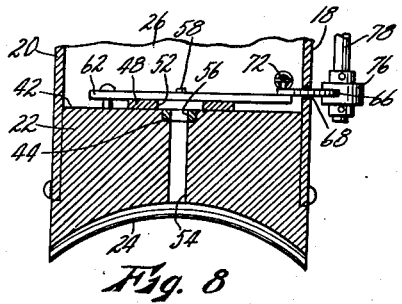
INVENTOR.
Thomas A. Purvis
BY Roy E. Hamilton,
Attorney.

Patented Oct. 6, 1953

2,654,510

UNITED STATES PATENT OFFICE 2,654,510

CORN PLANTING MACHINE HAVING ROTARY GROUND-ENGAGING SEED RESERVOIRS

Thomas A. Purvis, Tulsa, Okla.

Application July 25, 1949, Serial No. 106,700

1 Claim. (Cl. 222—170)

This invention relates to new and useful improvements in corn planting machines, and has particular reference to corn planting machines of the type adapted to plant corn in evenly spaced hills.

The principal object of the present invention is the provision of a corn planter supported by hollow ground-engaging wheels each serving as a reservoir for seed grain, and having means for discharging said grain at intervals through apertures in the rims of said wheels.

Another object is the provision, in a corn planter of the class described, of means for closing the apertures in the rims of the wheels, and means operable by the rotation of said wheels for opening said apertures at predetermined points in the rotation of the wheels, whereby grain is discharged from said wheels.

A further object is the provision of a corn planter of the class described wherein the wheel treads are so shaped as to cover the seeds dropped therefrom and to pack the earth thereabout.

Other objects are simplicity and economy of construction, dependability of operation, adaptability to plant various types of seeds, and adaptability to function as a check-row planter.

With these objects in view, as well as other objects which will occur in the course of the specification, reference will be had to the drawing, wherein:

Fig. 3 is an enlarged fragmentary section taken on line III—III of Fig. 2.

Fig. 4 is an enlarged section taken on line IV—IV of Fig. 2.

Fig. 5 is an enlarged fragmentary section taken on line V—V of Fig. 4, partially broken away, showing the corn dropping mechanism in its normal position in solid lines, and in its dropping position in dotted lines.

Fig. 6 is a fragmentary section taken on line VI—VI of Fig. 5.

Fig. 7 is a fragmentary section taken on line VII—VII of Fig. 5.

Fig. 8 is a fragmentary section taken on line VIII—VIII of Fig. 6.

Figure 1:
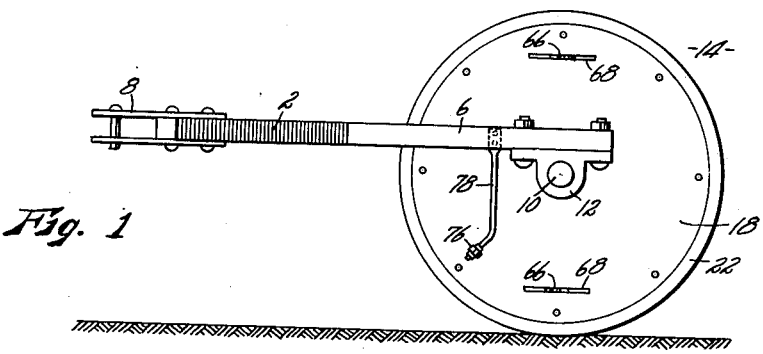
Figure 1 is a side elevation of a corn planting machine embodying the present invention.

Like reference numerals apply to similar parts throughout the several views, and the numeral 2 applies to a yoke frame having spaced apart parallel side bars 4 and 6 which are normally disposed horizontally, and a forwardly projecting tongue 8 adapted to be attached to a tractor or other towing vehicle. An axle 10 extends transversely between side bars 4 and 6, having its end portions carried rotatably in bearings 12 mounted on said side bars adjacent the rearward ends thereof. Mounted on said axle are two planting wheels 14, the center-to-center spacing of said wheels corresponding to the distance desired between successive rows of corn.

Figure 9:
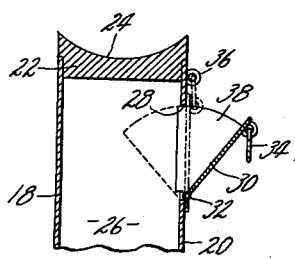
Fig. 9 is an enlarged fragmentary section taken on line IX—IX of Fig. 4, showing the filling door open in solid lines and closed in dotted lines.

Each of said wheels is hollow, comprising a hub 16 rigidly secured to axle 10, a pair of spaced apart side walls 18 and 20 rigidly fastened to said hub and extending radially to said axle, and a substantially annular rim member 22 extending between and rigidly fastened to the peripheral edges of said side walls. The outer or tread surface 24 of said rim is transversely concave, for a purpose hereinafter set forth. Hub 16, side walls 18 and 20, and rim 22 form a hollow annular chamber 26 which serves as a reservoir for seed corn or other material to be planted. Said reservoir may be filled through an opening 28 in side wall 20, as best shown in Figs. 4 and 9. Said opening is provided with a closure door 30 hinged at 32 at one edge of the opening and provided at its opposite edge with a hook fastener 34 adapted to engage an eye 36 fixed in side wall 20 to secure the door in the closed position. Said door is provided at its transverse edges with walls 38 which extend inwardly through opening 28 when the door is open, thereby forming a chute for directing the seed corn into reservoir 26. Said walls are formed at their inner edges to present flanges 40 for engaging side wall 20 adjacent opening 28 to limit the outward movement of door 30.

Rim 22 of the wheel is thickened at diametrically opposite points to form planar sections 42 on the inner peripheral surface of said rim, said planar sections being parallel to each other and at right angles to a diameter of the wheel. An elongated slide bar 44 is carried slidably in a groove 46 formed in each of planar surfaces 42, said slides being disposed in and movable in the plane of rotation of the wheel. A cover plate 48 is fixed to surface 42 by any suitable means such as screws 50 and covers groove 46 to retain slide bar 44 therein. Said cover plate has a hole 52 formed therein directly over slide bar 44. A hole 54 is formed through rim 22 of the wheel, said hole extending from the base of groove 46 and extending through the outer concave surface of said rim. Hole 54 is out of registry with hole 52. A hole 56 is formed through slide bar 44 and is adapted by the sliding movement of said slide bar in groove 46 to be moved from a position in registry with hole 52 of cover plate 48, as shown in solid lines in Fig. 5, to a position in registry with hole 54 in the rim as shown in dotted lines.

Slide bar 44 is operated by a pin 58 fixed in said slide bar intermediate its ends, and extending outwardly through a slot 60 formed in cover plate 48, said slot being elongated in the direction of travel of the slide bar. A lever 62 overlying the outer surface of cover plate 48 and disposed transversely to slide bar 44, is pivotally attached at one end to rim surface 42 at 64, and is provided at its opposite end with a planar head 66 which projects outwardly through a slot 68 formed in side wall 18 of the wheel, said slot being parallel to slide bar 44. Intermediate its ends, lever 62 is provided with an elongated slot 70 for engaging the extended end portion of pin 58. Lever 62 is normally held resiliently at approximately the center point of its pivotal movement as shown in solid lines in Fig. 5, with hole 56 of the slide bar registered with hole 52 of the cover plate, by means of two springs 72. Said springs are each secured at one end to pins 74 fixed in head 66, extend in opposite directions from said head, and are secured at their outer ends to pins 74 fixed in rim 22.

Levers 62 of the planting mechanisms of each wheel are operated by a roller 76 carried for rotation on a rod 78 fixed to the adjacent side bar 4 or 6 of yoke frame 2. Said rollers are rotatable about axes substantially radial to the wheels, and are disposed to lie within the circular path of the portions of heads 66 of levers 62 which project outwardly from side walls 18 of the wheels. Said lever heads each are formed to present a shoulder 80 for engaging said rollers.

In operation, after the reservoir chambers 26 of the wheels 14 have been filled with seed corn as previously described, the planting machine is pulled forwardly by means of tongue 8. The wheels then rotate in contact with the ground, and as each slide bar mechanism passes below the lever of the grain in the reservoir, a quantity of grain will pass through hole 52 in cover plate 48 and will enter hole 56 in slide bar 44. The thickness of said slide bar, and the dimensions of hole 56, may be so proportioned that said hole will contain the correct number of kernels of corn to plant one hill. As the wheel rotates further, head 66 of lever 62 contacts operating roller 76, and is thereby pivoted to the position shown in dotted lines in Fig. 5. Said lever, by means of pin 58 moves slide bar 44 so that hole 56 therein moves out of registry with hole 52 in the cover plate 48, and into registry with hole 54 in the wheel rim 22. The kernels of corn contained in hole 56 of the slide bar then pass by gravity through hole 54 of the rim and fall to the ground. As soon as lever head 66 passes under roller 76, lever 62 is returned to its normal position by springs 72, and a new charge of grain is received in hole 56 of the slide bar through hole 52 of cover plate 48.

Figure 2:
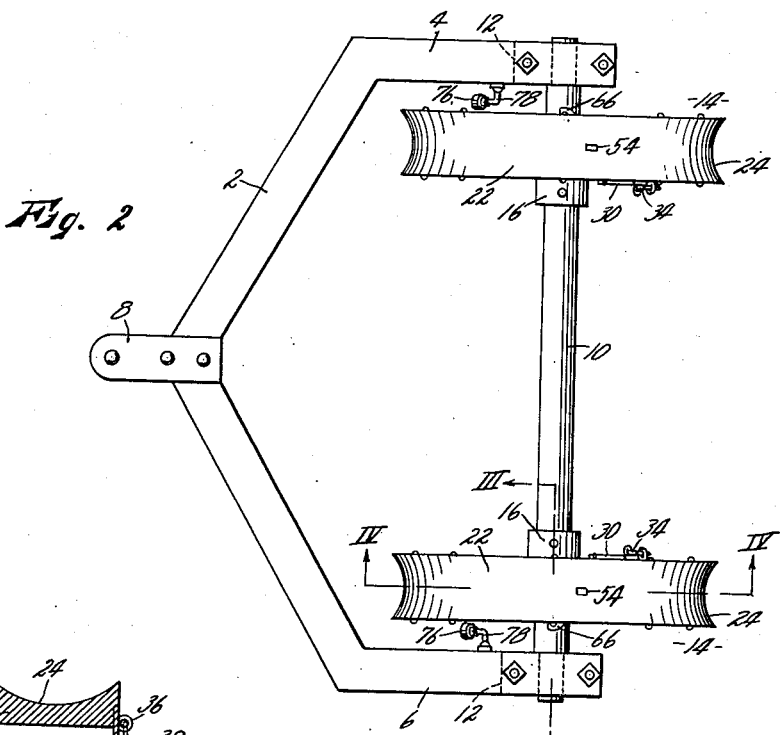
Fig. 2 is a plan view of the machine.

As best shown in Figs. 1 and 2, roller 76 is so disposed that the charge of grain is dropped to the ground just ahead of the point at which the wheel contacts the ground, and directly in the path of the wheel. As the wheel passes over the grain, the concave surface 24 of the wheel tread forces earth toward the center of the tread to cover the grain, and the weight of the machine packs said earth firmly about the grain. In case it is desired to back the planting machine when maneuvering it about the field, lever head 66 will of course be contacted by operating roller 76, and the lever 62 will be pivoted in the opposite direction. However, no corn will be dropped, since the rearward movement of the slide 44 moves only a blank portion of said slide over rim discharge opening 54.

Thus a planting machine having several advantages has been produced. It is very simple in construction and operation, and hence economical and not likely to get out of order. A specified amount of grain is deposited at accurately predetermined intervals, and is adequately covered and tamped. The constant agitation of the grain produced by the rotation of the wheels effectively prevents bridging over or clogging of the discharge openings by the grain. Since the spacing of the hills is very accurate and uniform, the machine is adapted for check-row planting. The spacing of the hills is determined by the circumferential distances between rim openings 54, and it is evident that by changing the diameter of the wheels more or fewer planting mechanisms could be built into the wheel. Likewise, although two wheels are shown in the machine as described, more wheels could be carried on axle 10 for simultaneous planting of a greater number of rows. It is contemplated that these and many other minor changes of construction and operation could be made without departing from the spirit of the invention.

What I claim is:

In a corn planting machine having a frame carrying wheels chambered to form seed reservoirs, and having apertures formed in the rims thereof communicating with said reservoirs, a feed control mechanism for each of said apertures comprising a cover plate carried by said wheel in spaced relation from the inner surface of said rim and having a hole formed therein out of register with said rim aperture, a slide carried for reciprocal movement between said rim and said cover plate and having a hole formed therethrough, resilient means securing said slide in a central position wherein the hole thereof registers with said cover plate hole, a lever operably joined to said slide and extending outwardly of said wheel generally parallel to the axis thereof, and an operating member fixed to said frame within the path of the projection portion of said lever, said operating member being adapted to engage and operate said lever at one point in the rotation of said wheel, whereby as said planting machine travels forwardly, said lever moves said slide to move the slide and rim apertures into registry, and whereby as said planting machine travels rearwardly, said lever moves said slide to move the slide and rim apertures still further out of registry.

THOMAS A. PURVIS.

References Cited in the file of this patent

UNITED STATES PATENTS

| Number | Name | Date |
| --- | --- | --- |
| 99,792 | Simonton | Feb. 14, 1870 |
| 264,743 | North | Sept. 19, 1882 |
| 461,708 | Pirkle | Oct. 20, 1891 |
| 939,635 | Roos | Nov. 9, 1909 |